US012311675B2

(12) United States Patent
Osakabe

(10) Patent No.: US 12,311,675 B2
(45) Date of Patent: *May 27, 2025

(54) LIQUID CONSUMPTION DEVICE

(71) Applicant: BROTHER KOGYO KABUSHIKI KAISHA, Nagoya (JP)

(72) Inventor: Yoshinori Osakabe, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,878

(22) Filed: Mar. 25, 2024

(65) Prior Publication Data

US 2024/0308232 A1 Sep. 19, 2024

Related U.S. Application Data

(63) Continuation of application No. 18/327,121, filed on Jun. 1, 2023, now Pat. No. 11,975,545, which is a (Continued)

(30) Foreign Application Priority Data

Mar. 27, 2019 (JP) ................................ 2019-061417

(51) Int. Cl.
*B41J 2/175* (2006.01)

(52) U.S. Cl.
CPC ................................ *B41J 2/17596* (2013.01)

(58) Field of Classification Search
CPC ......... B41J 29/13; B41J 2/17596; B41J 2/175
See application file for complete search history.

(56) References Cited

U.S. PATENT DOCUMENTS 10,300,703 B2 5/2019 Okumura et al.
11,090,945 B2 8/2021 Ochiai et al.
(Continued)

FOREIGN PATENT DOCUMENTS

JP 2002-103644 A 4/2002
JP 2014-159106 A 9/2014
(Continued)

OTHER PUBLICATIONS

International Search Report issued in corresponding International Patent Application No. PCT/JP2020/013606, mailed Jun. 16, 2020, 5 pages.

(Continued)

*Primary Examiner* — An H Do

(74) *Attorney, Agent, or Firm* — Merchant & Gould P.C.

(57) ABSTRACT

In a printer unit, ink is poured into a storage chamber from an inlet of a tank. The storage chamber communicates with an air chamber. An air tube connects the air chamber and the outside of the tank and is opened and closed by a valve. A cover is movable to a first position in which the inlet is covered and a second position in which the inlet is exposable via a third position being a position between the first position and the second position. A valve opening/closing mechanism opens a valve when the cover is located on a side closer to the first position than the third position, and closes the (Continued)

valve when the cover is located between the third position and the second position. When the cover moves from the third position to the first position, a cap fits over the inlet to seal the storage chamber.

20 Claims, 7 Drawing Sheets

Related U.S. Application Data continuation of application No. 17/484,759, filed on Sep. 24, 2021, now Pat. No. 11,701,898, which is a continuation of application No. PCT/JP2020/013606, filed on Mar. 26, 2020.

(56) References Cited

U.S. PATENT DOCUMENTS

| | | | |
|---|---|---|---|
| 11,584,133 B2 | 2/2023 | Nakazawa et al. | |
| 11,975,545 B2 * | 5/2024 | Osakabe | B41J 2/175 |
| 2014/0085386 A1 | 5/2014 | Wei et al. | |
| 2017/0120609 A1 | 5/2017 | Kimura et al. | |
| 2017/0120617 A1 | 5/2017 | Matsumura et al. | |
| 2018/0244063 A1 | 8/2018 | Okumura et al. | |

FOREIGN PATENT DOCUMENTS

| | | |
|---|---|---|
| JP | 2017-081076 A | 5/2017 |
| JP | 2017-081086 A | 5/2017 |
| JP | 2017-081121 A | 5/2017 |
| JP | 2018-140549 A | 9/2018 |
| JP | 2018-161818 A | 10/2018 |

OTHER PUBLICATIONS

Written Opinion issued in corresponding International Patent Application No. PCT/JP2020/013606, 3 pages, mailed Jun. 16, 2020.
International Preliminary Report on Patentability and Written Opinion of the International Searching Authority issued in corresponding International Patent Application No. PCT/JP2020/013606, dated Sep. 28, 2021.
Office Action issued in the corresponding Japanese Application No. 2023-085127, Sep. 3, 2024.

* cited by examiner

LIQUID CONSUMPTION DEVICE

REFERENCE TO RELATED APPLICATIONS

This application is a continuation of U.S. patent application Ser. No. 18/327,121, filed Jun. 1, 2023, which is a continuation of U.S. patent application Ser. No. 17/484,759, filed Sep. 24, 2021, which is a continuation application of International Application No. PCT/JP2020/013606 filed on Mar. 26, 2020, which claims priority from Japanese Patent Application No. 2019-061417 filed on Mar. 27, 2019. The contents of the aforementioned applications are incorporated herein by reference in their entirety.

BACKGROUND ART

Technical Field

The present invention relates to a liquid consumption device including a tank having a storage chamber and an air chamber.

Background

In the related art, known is an inkjet printer including a head which ejects ink and a tank which stores the ink. When the ink is ejected from the head, the ink is supplied from the tank to the head. An inside of the tank is opened to the air, so that the same amount of air as the ink supplied to the head is caused to flow into the tank.

As for the tank, suggested is a configuration where an air chamber is located below a storage chamber which stores ink (refer to JP-A-2017-81086). The storage chamber and the air chamber are configured to communicate with each other, and the air chamber is also configured to communicate with an outside of the tank. When the ink enters the air chamber from the storage chamber, a liquid level of the ink is lower than an ejection port forming surface of the head, so that a water head difference occurs between the liquid level of the ink and the ejection port forming surface of the head and a space in the head in which the ink exists becomes in a negative pressure state.

When pouring ink into the storage chamber, an inlet of the storage chamber should be in an opened state. In order to open the inlet, a cover that covers the inlet should be opened. In conjunction with a user operation of opening the cover, a liquid valve provided on a flow path from the storage chamber to the head and an air valve provided on a flow path from the air chamber to an outside of the tank are each closed. Thereafter, the user removes a cap, which seals the inlet of the storage chamber, to open the inlet.

Here, it is assumed that the user pours the ink into the tank via the inlet and then closes the cover without sealing the inlet of the storage chamber with the cap. The cover is closed, so that each of the valves is opened. As a result, the ink can flow out from the storage chamber to the head and the air chamber is opened to the air. However, since the inlet is not sealed with the cap, the storage chamber is also opened to the air. Then, the ink flows out from the storage chamber to the air chamber due to the water head difference, so that the air chamber is filled with the ink. In this state, when the liquid level of the ink in the storage chamber is located higher than the ejection port forming surface of the head, the inside of the head is not in the negative pressure state. As a result, when forming an image on a sheet, a malfunction occurs and the ink may be leaked from the head. Further, even when the inlet is sealed with the cap in the state where the air chamber is filled with the ink, the inside of the head is not in the negative pressure state. Therefore, the ink filled in the air chamber should be once discharged.

DESCRIPTION

Summary

The specification discloses a technology for suppressing an air chamber from being filled with ink due to outflow of the ink from a storage chamber to the air chamber as an air valve is opened in a state where an inlet is not sealed with a cap.

An aspect of the present disclosure is a liquid consumption device including:

- a liquid consuming unit configured to consume liquid;
- a tank having a storage chamber configured to store liquid and an inlet for pouring liquid into the storage chamber;
- a cap configured to be fitted with the inlet and be capable of sealing the inlet;
- an air chamber configured to communicate with the storage chamber, at least a part of the air chamber being located below the storage chamber at a use posture of the liquid consumption device;
- a liquid flow path configured to connect the liquid consuming unit and the storage chamber, liquid being allowed to flow through the liquid flow path;
- an air flow path configured to connect the air chamber and an outside of the tank, air being allowed to flow through the air flow path;
- an air valve configured to open and close the air flow path;
- a cover configured to be movable between a first position in which the inlet is covered and a second position in which the inlet is allowed to be exposed; and
- a valve opening/closing mechanism configured to open the air valve when the cover is located on a side closer to the first position than a third position where is a position between the first position and the second position, and close the air valve when the cover is located between the third position and the second position,
- in which when the cover is moved from the third position to the first position, the cap fits over the inlet to seal the storage chamber.

According to the above configuration of the liquid consumption device, when the cover is moved from the third position toward the first position, the cover is not moved to the first position in a state where the cap is removed from the inlet because the cap has already fitted over the inlet. Therefore, a situation where the air valve is opened in a state where the inlet is not sealed and the liquid is thus caused to flow out from the storage chamber to the air chamber is suppressed.

According to the liquid consumption device of the present disclosure, the air valve is suppressed from being opened in the state where the inlet is not sealed with the cap.

BRIEF DESCRIPTION OF DRAWINGS

FIGS. 1A and 1B are outer perspective views of a complex machine 10 according to an embodiment, in which FIG. 1A shows a state where a scanner unit 12 is located in a closed position, and FIG. 1B shows a state where the scanner unit 12 is located in an open position.

FIGS. 5A to 5C are schematic views showing operations of a cover 100A, a cap 104 and the valve 170A, in which FIG. 5A shows a state where the cover 100A is located in a position P1, FIG. 5B shows a state where the cover 100A is located in a position P7, and FIG. 5C shows a state where the cover 100A is located in a position P2.

FIGS. 7A and 7B are schematic views showing configurations of the printer unit 11 of a modified embodiment, in which FIG. 7A shows a state where a cap 147 is closed and FIG. 7B shows a state where the cap 147 is opened and a restriction member 181 restricts a movement of the cover 100A.

DETAILED DESCRIPTION

Figure 1A:
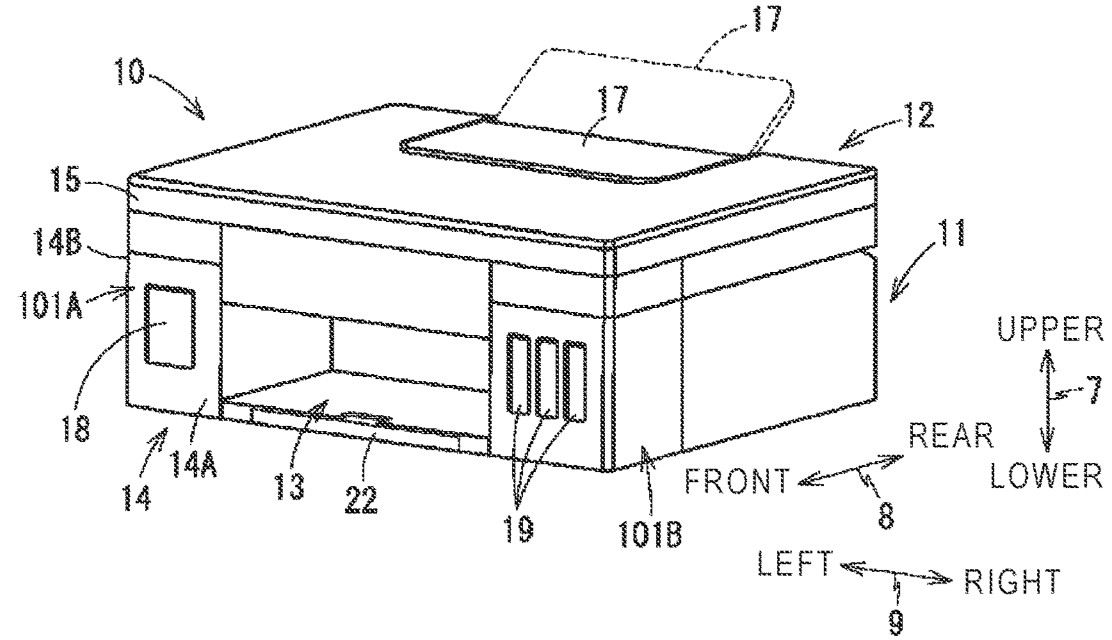

Hereinafter, each embodiment of the present invention will be described. Note that, the embodiments that are described below are just examples of the present invention, and the embodiments of the present invention can be changed as appropriate without changing the gist of the present invention. Further, in descriptions below, the advancing from a start point toward an end point of an arrow is expressed as 'heading' and the coming and going on a line connecting the start point and the end point of the arrow is expressed as 'direction'. In other words, the heading is one component of the direction. Further, an upper and lower direction 7 is defined based on a posture where a complex machine 10 and a black tank 18 and three-color tanks 19 mounted on the complex machine 10 are equipped on a horizontal plane so that they can be used (refer to FIGS. 1A and 1B, which can also be described as "use posture" of the complex machine 10), a front and rear direction 8 is defined based on a surface (front surface), on which an opening 13 (refer to FIGS. 1A and 1B) is provided, of a housing 14 of the complex machine 10, and a right and left direction 9 is defined when the complex machine 10 is seen from the front surface. The upper and lower direction 7, the front and rear direction 8, and the right and left direction 9 are orthogonal to each other.

[Overall Configuration of Complex Machine 10]

As shown in FIG. 1A, the complex machine 10 has a substantially cuboidal shape. The complex machine 10 includes a scanner unit 12, and a printer unit 11. Note that, the complex machine 10 may also have a facsimile function and the like.

[Scanner Unit 12 and Housing 15]

Figure 1B:
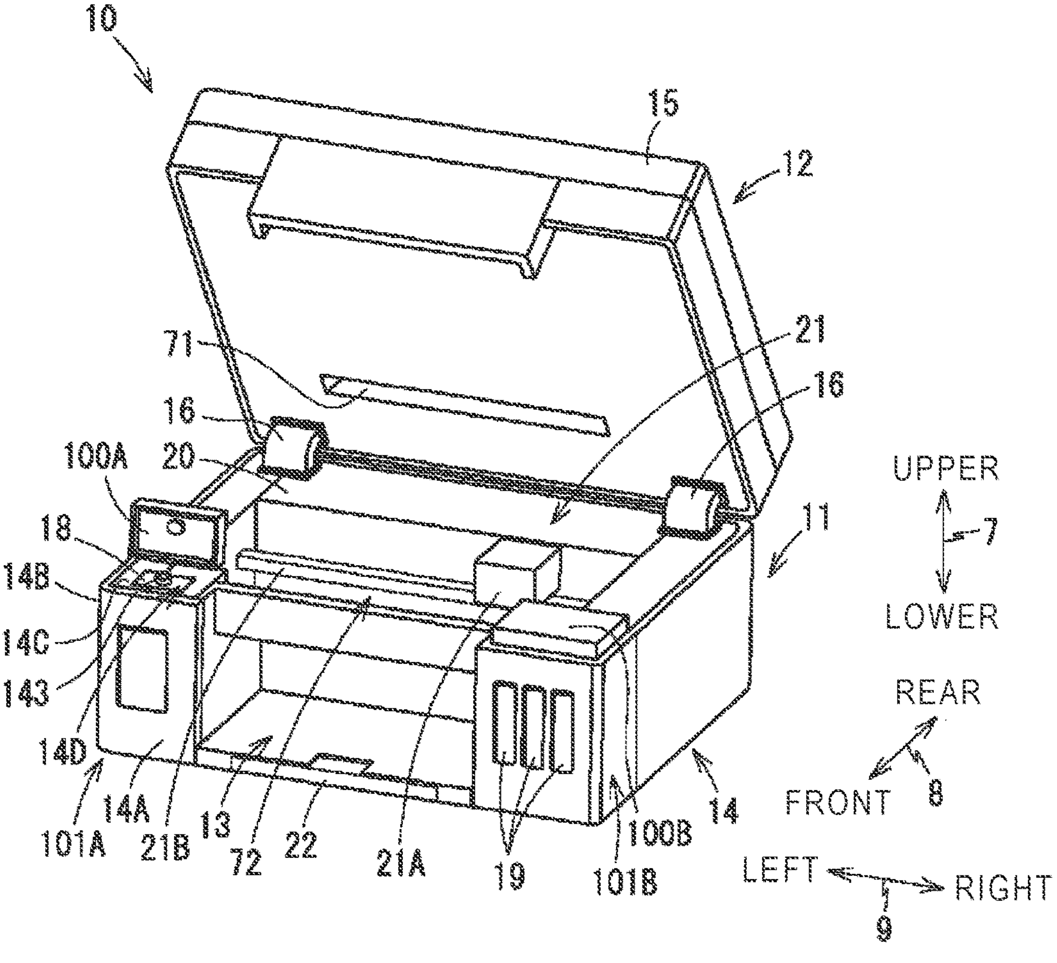

As shown in FIG. 1A, the scanner unit 12 is located at an upper part of the complex machine 10. The scanner unit 12 is arranged in a housing 15. The housing 15 has a substantially cuboidal shape. The housing 15 is coupled to a housing 14 near a rear wall of the housing 14 by means of coupling members 16. By means of the coupling members 16, the housing 15 can rotate with respect to the housing 14. As shown in FIG. 1B, when a front part of the housing 15 is raised by a user of the complex machine 10, the housing 15 is opened with respect to the housing 14. In a space between the scanner unit 12 and the printer unit 11, i.e., above the printer unit 11, a recording unit 21 (refer to FIG. 2), covers 100A and 100B and the like located in the housing 14 are exposed to an outside. In this state, the user can operate the covers 100A and 100B, and the like. As shown in FIG. 1A, in a state where the housing 15 is closed, the recording unit 21, the covers 100A and 100B, and the like are not exposed to the outside.

[Printer Unit 11 and Housing 14]

The printer unit 11 is an example of the liquid consumption device. The printer unit 11 is located at a lower part of the complex machine 10, and records an image on a sheet-like recording medium 5 (refer to FIG. 2) in an inkjet recording manner. Examples of the recording medium 5 include paper, fabric, a plastic sheet, an OHP sheet, an envelope, and the like.

The printer unit 11 has a feeding path 71 (refer to FIG. 1B) and a feeding tray 17 (refer to FIG. 1A) provided to the housing 15. The feeding path 71 is a path through which the recording medium 5 (refer to FIG. 2) on which an image is formed passes. The feeding tray 17 opens and closes the feeding path 71 on an upper surface of the housing 15. The feeding tray 17 closes the feeding path 71 in a first state (a state shown with the solid line in FIG. 1A) where the feeding tray 17 is rotated to constitute a part of the upper surface of the housing 15. On the other hand, the feeding tray 17 opens the feeding path 71 in a second state (a state shown with the broken line in FIG. 1A) where the feeding tray 17 is rotated to protrude rearward from the housing 14. In the second state, an upper surface of the feeding tray 17 becomes a tray surface that supports and guides the recording medium 5 to the feeding path 71.

Figure 2:
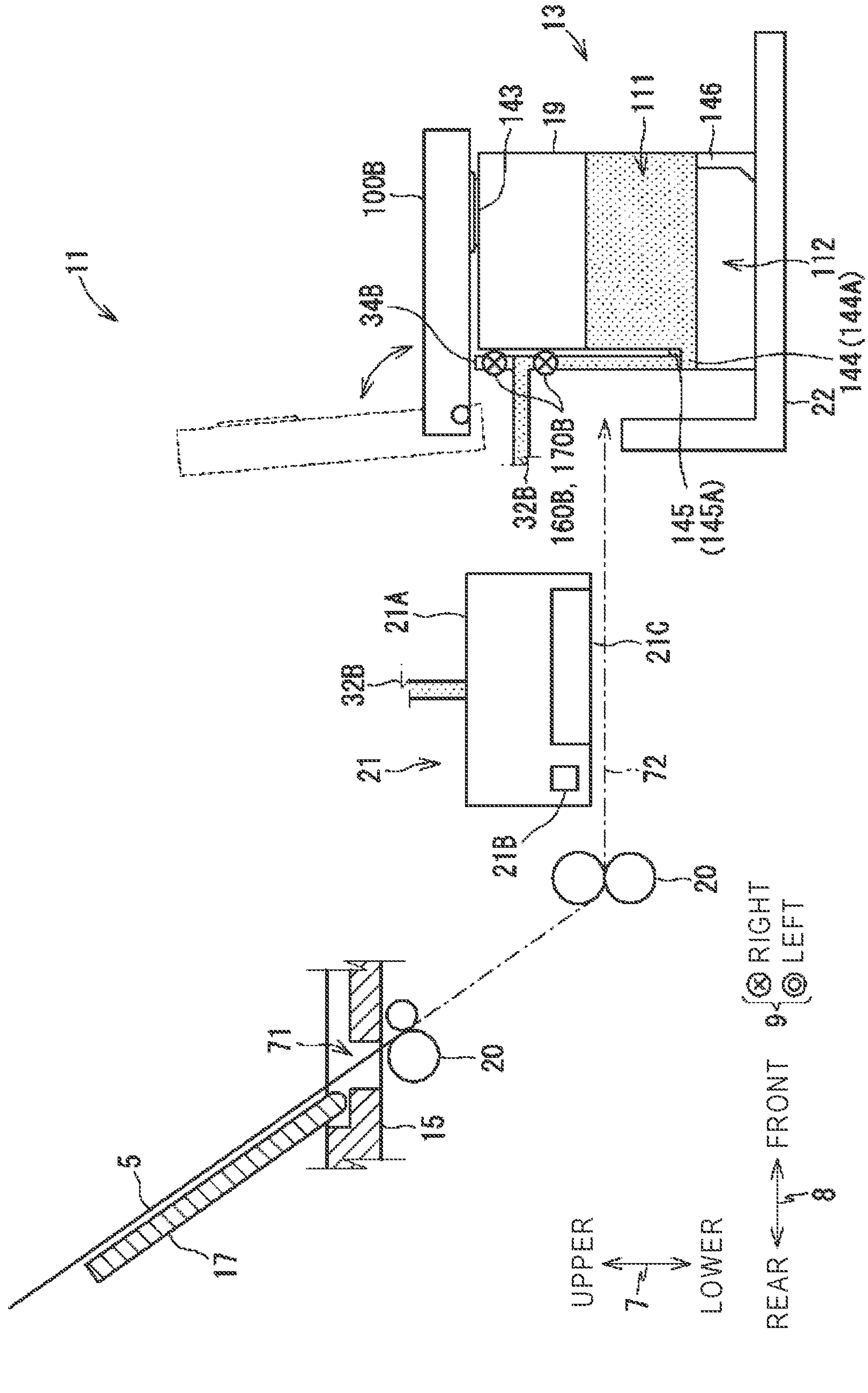
FIG. 2 is a longitudinally sectional view schematically showing an internal structure of a printer unit 11.

The printer unit 11 has the housing 14. The housing 14 has a substantially cuboidal shape, and is also formed into a box shape whose upper is opened. A front wall 14A of the housing 14 is formed with an opening 13. As shown in FIG. 2, the printer unit 11 includes two sets of roller pairs 20, a conveying path 72, a recording unit 21 (an example of a consuming unit), and a discharge tray 22, in an internal space of the housing 14.

The roller pairs 20 feed the recording medium 5 on the feeding tray 17 to a conveying path 72, i.e., to the lower of a head 21A provided to the recording unit 21, via the feeding path 71.

The conveying path 72 is a path through which the recording medium 5 passing through the feeding path 71 is conveyed. The conveying path 72 is formed from the rear to the front of the recording unit 21 below the recording unit 21.

The recording unit 21 has the head 21A, and a guide rail 21B which guides the head 21A in the right and left direction 9. The head 21A is supplied with inks stored in a black tank 18 and three-color tanks 19. The head 21A ejects the inks from a plurality of nozzles formed in a lower surface 21C of the head 21A toward the recording medium 5. Thereby, an image is recorded on the recording medium 5. That is, the recording unit 21 consumes the inks.

As shown in FIGS. 1A and 1B, the discharge tray 22 is arranged below and in front of the recording unit 21, in the opening 13 of the housing 14. The discharge tray 22 supports the sheet on which an image is recorded by the recording unit 21.

[Black Tank 18 and Three-Color Tanks 19]

As shown in FIGS. 1A and 1B, the printer unit 11 further includes the black tank 18 and the three-color tanks 19 (an example of the tank) in the housing 14. The black tank 18 and the three-color tanks 19 are set up in the housing 14. The description "the black tank 18 and the three-color tanks 19 are set up in the housing 14" indicates a configuration where the black tank 18 and the three-color tanks 19 are not scheduled to be replaced by the user and inks are replenished in a state where the black tank 18 and the three-color tanks 19 are fixed to the housing 14.

The black tank 18 is set up at the use posture in a tank accommodation unit 101A, and stores black ink (an example of liquid). The tank accommodation unit 101A is arranged at the left of the opening 13 at a front end portion in the housing 14. A space in the tank accommodation unit 101A is demarcated by a bottom part (not shown), a front wall 14A, a right wall 14B, an upper wall 14C and the like of the housing 14. The upper wall 14C is arranged on upper ends of the front wall 14A, the right wall 14B and the like, and closes an upper end of the space in the tank accommodation unit 101A. The upper wall 14C is formed at its central portion with an opening 14D. From the opening 14D, an inlet 143 of the black tank 18 is exposed.

Figure 3:
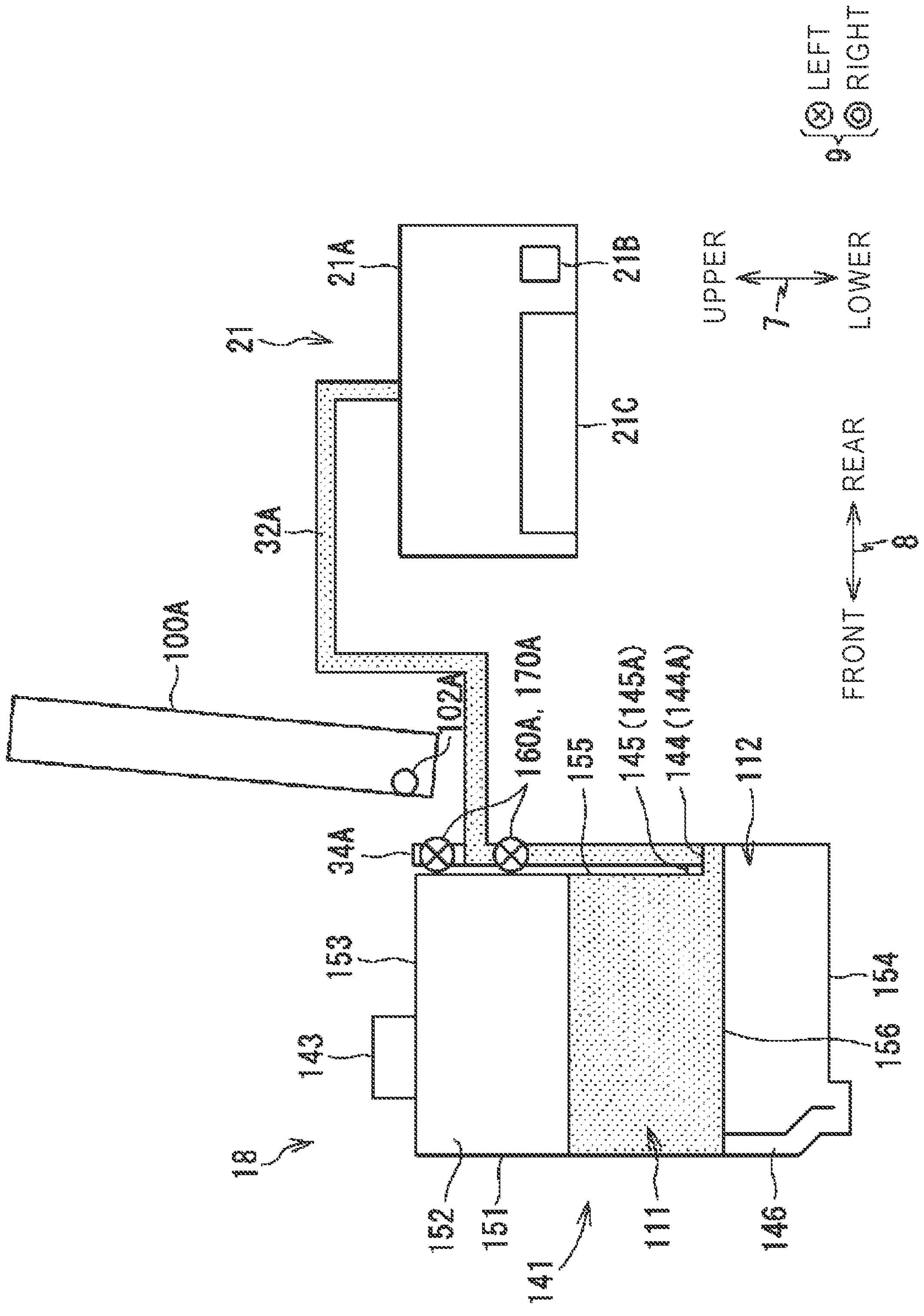
FIG. 3 is a schematic view showing a recording unit 21, a black tank 18 and a peripheral configuration of the black tank 18.

As shown in FIG. 3, the black tank 18 has a substantially cuboidal shape, and includes a housing 141, an inlet 143, a liquid outflow part 144, an air inflow part 145, and a communication flow path 146.

[Housing 141]

The housing 141 is formed of a resin material such as polypropylene or the like. The resin material has such transparency that a storage amount of ink in the black tank 18 can be visibly seen from an outside through a window formed in the front wall 14A (refer to FIGS. 1A and 1B). The housing 141 is integrally formed by injection molding the resin material. Note that, the housing 141 may also be combined by a plurality of members, without being integrally formed.

The housing 141 has a front wall 151, a right wall 152, an upper wall 153, a lower wall 154, a rear wall 155, and a partition wall 156. A left end of the housing 141 is closed by a left wall (not shown). Note that, the left side and the like of the housing 141 may also be opened in some cases, due to molding reasons of the housing 141. In this case, a film (not shown) is welded to a left end surface of the housing 141, so that the left side of the housing 141 is sealed.

[Inlet 143]

The inlet 143 is arranged in a position ahead of a center of an upper surface of the upper wall 153. The inlet 143 protrudes upward from the upper surface of the upper wall 153. An upper end of the inlet 143 is formed with an opening. The inlet 143 is formed to communicate the storage chamber 111 and an outside of the black tank 18. The user can pour ink into the storage chamber 111 from an outside through the inlet 143.

[Storage Chamber 111 and Air Chamber 112]

The storage chamber 111 is demarcated by the front wall 151, the right wall 152, the upper wall 153, the rear wall 155, the partition wall 156 and the left wall. The storage chamber 111 can store ink. The storage chamber 111 is formed to communicate with the outside of the black tank 18 via a communication flow path 146 (which will be described later), an air chamber 112, and a communication flow path 145A and an air tube 34A which will be described later.

The air chamber 112 is demarcated by the front wall 151, the right wall 152, the lower wall 154, the rear wall 155, the partition wall 156, and the left wall. The air chamber 112 is located below the storage chamber 111. In the black tank 18, the storage chamber 111 and the air chamber 112 are demarcated by the partition wall 156.

Note that, an internal space of the air chamber 112 may also be demarcated by a partition wall (not shown). In this case, the air chamber 112 is divided into a plurality of rooms. The plurality of rooms is connected to each other so that the ink and the atmospheric air can communicate via a thin communication path (not shown).

FIG. 3 also shows a configuration where the entire air chamber 112 is located below the storage chamber 111. However, the present invention is not limited to the configuration. For example, the black tank 18 may be configured such that at least a part of the air chamber 112 is located below the storage chamber 111.

The communication flow path 146 is communicated so that the ink and the atmospheric air can flow between the storage chamber 111 and the air chamber 112. One end of the communication flow path 146 is a communication hole that is opened toward an inside of the storage chamber 111 on a bottom surface of the storage chamber 111. The other end of the communication flow path 146 is a communication hole that is opened toward an inside of the air chamber 112 on a bottom surface of the air chamber 112.

The bottom surface of the air chamber 112 and the partition wall 156 are located below a lower surface 21C (refer to FIG. 2) of the head 21A in the upper and lower direction 7 at the use posture of the complex machine 10. Specifically, the air chamber 112 is entirely located below a nozzle surface 41 in the upper and lower direction 7 at the use posture. Therefore, in a state where the storage chamber 111 is sealed, when there is no change in external pressure, for example, the ink stored in the storage chamber 111 does not continue to flow into the air chamber 112 through the communication flow path 146.

[Liquid Outflow Part 144 and Ink Tube 32A]

The liquid outflow part 144 protrudes rearward from a part of the rear wall 155 slightly above the partition wall 156. The liquid outflow part 144 is formed with a communication flow path 144A. One end of the communication flow path 144A is formed to communicate with the storage chamber 111. The communication flow path 144A extends rearward from the storage chamber 111.

The ink tube 32A is formed of an elastically deformable resin material. One end of the ink tube 32A is connected to the other end of the communication flow path 144A, and extends upward along the rear wall 155 of the black tank 18. The ink tube 32A is fixed to the rear wall 155 in a predetermined position near the upper wall 153 in the upper and lower direction 7. The other end of the ink tube 32A is connected to the head 21A. The ink in the storage chamber 111 flows out from the liquid outflow part 144 to the ink tube 32A through the communication flow path 144A, flows through the ink tube 32A and is then supplied to the head 21A.

[Air Inflow Part 145 and Air Tube 34A]

The air inflow part 145 is arranged at a part of the rear wall 155 near the partition wall 156 and different from the liquid outflow part 144 in the right and left direction 9 (specifically, a position at the left of the liquid outflow part 144). The air inflow part 145 protrudes rearward from the part. The air inflow part 145 is formed with a communication flow path 145A. One end of the communication flow path 145A is formed to communicate with the air chamber 112. The communication flow path 145A extends from the air chamber 112 along the rear wall 155 to a position above the partition wall 156 in the upper and lower direction 7 and closer to the partition wall 156 than an upper end of the rear wall 155.

The air tube 34A (an example of an air flow path) is formed of an elastically deformable resin material. One end of the air tube 34A is connected to the other end of the communication flow path 145A. The air tube 34A extends upward from the other end of the communication flow path 145A along the rear wall 155. The air tube 34A extends along the ink tube 32A at the right of the ink tube 32A extending along the rear wall 155. The other end of the air tube 34A reaches a position near the upper wall 153 in the upper and lower direction 7. The air tube 34A is fixed to the rear wall 155 near the other end. The other end of the air tube 34A is opened to the air. The air chamber 112 and the outside of the black tank 18 are formed to communicate with each other via the air inflow part 145 and the air tube 34A.

When ink is discharged from the head 21A, the ink stored in the storage chamber 111 is caused to flow out to the head 21A through the communication flow path 144A of the liquid outflow part 144 and the ink tube 32A. As a volume of the ink in the storage chamber 111 is reduced, a pressure of the air in the storage chamber 111 is lowered. As the pressure of the air in the storage chamber 111 is lowered, the air is caused to flow into the storage chamber 111 from the air chamber 112 via the communication flow path 146. Then, the external air is caused to flow into the air chamber 112 via the air inflow part 145 and the air tube 34A.

Note that, in the black tank 18, the air in the storage chamber 111 may expand due to variation in barometric pressure or change in temperature. Due to the expansion of the air in the storage chamber 111, the ink in the storage chamber 111 may be caused to flow into the air chamber 112 through the communication flow path 146. The air caused to flow into the air chamber 112 may return to the storage chamber 111 through the communication flow path 146 due to the outflow of the ink from the storage chamber 111 to the head 21A, the variation in barometric pressure or the change in temperature.

In FIGS. 1A and 1B, the three-color tanks 19 are set up in a tank accommodation unit 101B (refer to FIGS. 1A and 1B). The three-color tanks 19 store each of three-color inks (an example of the liquid) of cyan, magenta and yellow. The three-color tanks 19 each have the same configuration as the black tank 18, except that the storage chamber 111, the air chamber 112, the inlet 143, the liquid outflow part 144, the air inflow part 145 and the communication flow path 146 are provided for each of the three colors (refer to FIG. 2). For this reason, the detailed descriptions of the configurations of the three-color tanks 19 are omitted. The tank accommodation unit 101B has a configuration similar to the tank accommodation unit 101A, except that the tank accommodation unit 101B is arranged at the right of the opening 13 at the front end portion of the internal space of the housing 14, a size of an internal space thereof is different and the upper wall 14C is formed with openings for three inlets 143, as compared to the tank accommodation unit 101A. For this reason, the detailed descriptions of the configuration of the tank accommodation unit 101B are omitted.

[Covers 100A and 100B and Cap 104]

As shown in FIG. 1B, the printer unit 11 further has covers 100A and 100B in the housing 14. The cover 100A is exposed to an outside when the scanner unit 12 is opened with respect to the printer unit 11. The cover 100A is arranged above the upper wall 14C of the tank accommodation unit 101A.

Figure 5A:
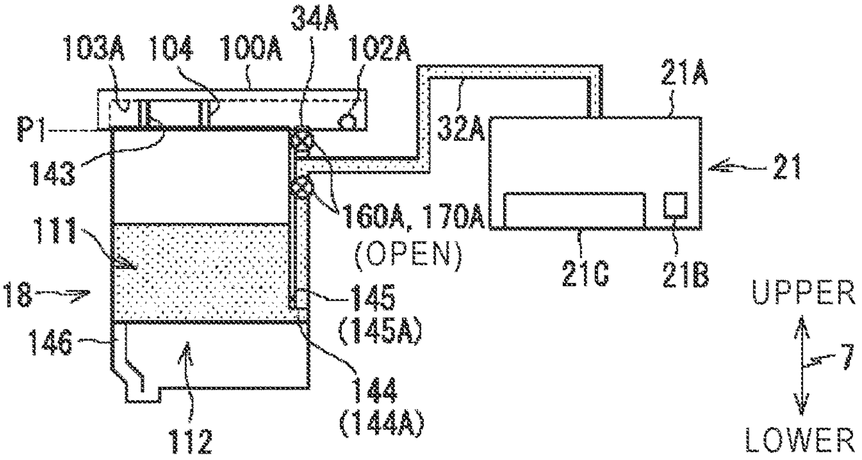
Figure 5B:
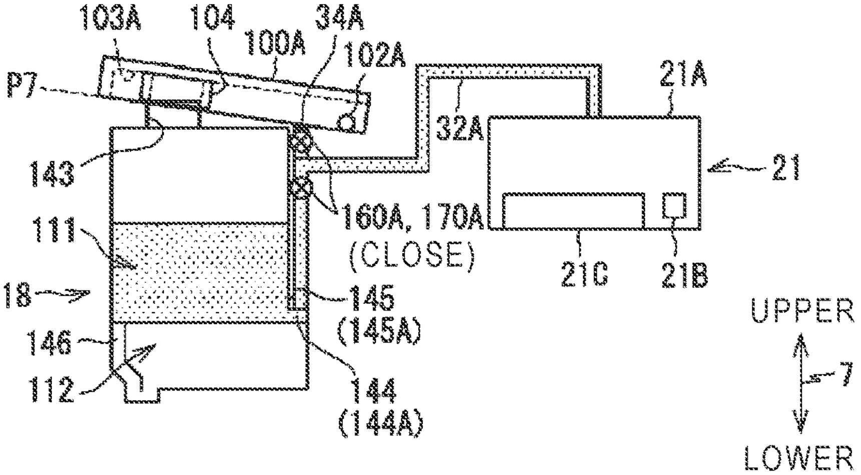
Figure 5C:
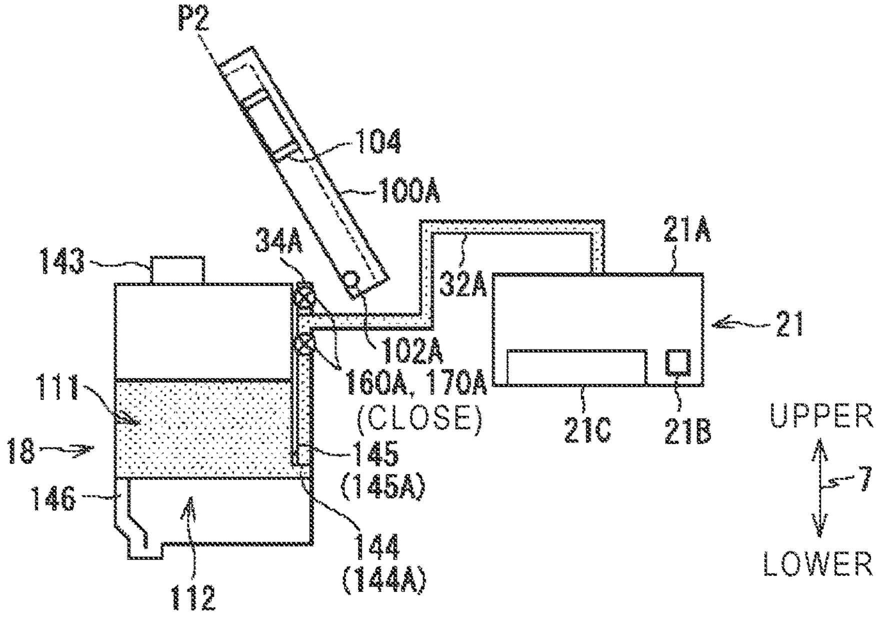

The cover 100A is movable between a position P1 (refer to FIG. 5A) and a position P2 (refer to FIG. 5C). The positions P1 and P2 are examples of the first position and the second position. The cover 100A located in the position P1 covers the upper wall 14C of the tank accommodation unit 101A and the inlet 143 of the black tank 18 (refer to FIGS. 1A and 1B). The cover 100A located in the position P2 exposes the upper wall 14C of the tank accommodation unit 101A and the inlet 143 of the black tank 18 to the outside.

A shaft 102A is arranged near a rear end of the cover 100A located in the position P1. The shaft 102A extends in the right and left direction 9. The shaft 102A is supported by the housing 14 (refer to FIGS. 1A and 1B) so as to be rotatable about a central axis of the shaft 102A. When the cover 100A is rotated together with the shaft 102A so that a front end part of the cover 100A moves upward, the cover 100A is moved from the position P1 to the position P2. When the cover 100A is rotated together with the shaft 102A so that the front end part of the cover 100A moves downward, the cover 100A is moved from the position P2 to the position P1.

A cap 104 is coupled to a lower surface 103A of the cover 100A located in the position P1. The cap 104 protrudes downward from the lower surface 103A in the upper and lower direction 7. The cap 104 can be fitted with the inlet 143 of the black tank 18 to seal the inlet 143. The cover 100A is moved from the position P2 to the position P1 by a user operation. In conjunction with the user operation, the cap 104 fits over the inlet 143 to seal the inlet 143. In addition, the cover 100A is moved from the position P1 to the position P2 by a user operation. In conjunction with the user operation, the cap 104 is removed from the inlet 143 to open the inlet 143.

The cover 100B has a configuration similar to the cover 100A, except that a size is different, the cover 100B is arranged above the upper wall 14C of the tank accommodation unit 101B and the cap 104 for each of the three colors is coupled, as compared to the cover 100A. For this reason, the detailed descriptions of the cover 100B are omitted.

[Valves 170A and 170B and Valve Opening/Closing Mechanisms 160A and 160B]

The printer unit 11 further includes, in the housing 14 (refer to FIGS. 1A and 1B), a valve 170A and a valve opening/closing mechanism 160A (refer to FIG. 3), and a valve 170B and a valve opening/closing mechanism 160B (refer to FIG. 2).

The valve 170A is an example of the liquid valve and the air valve. The valve 170A is a tube valve which opens and closes the ink tube 32A and the air tube 34A aligned along the rear wall 155 of the black tank 18. Note that, in FIGS. 3 and 5, for convenience, the valve 170A of the ink tube 32A and the valve 170A of the air tube 34A are individually shown. However, as shown in FIGS. 4A and 4B, the valve 170A opens and closes the ink tube 32A and the air tube 34A in the same position in the upper and lower direction 7.

Figure 4A:
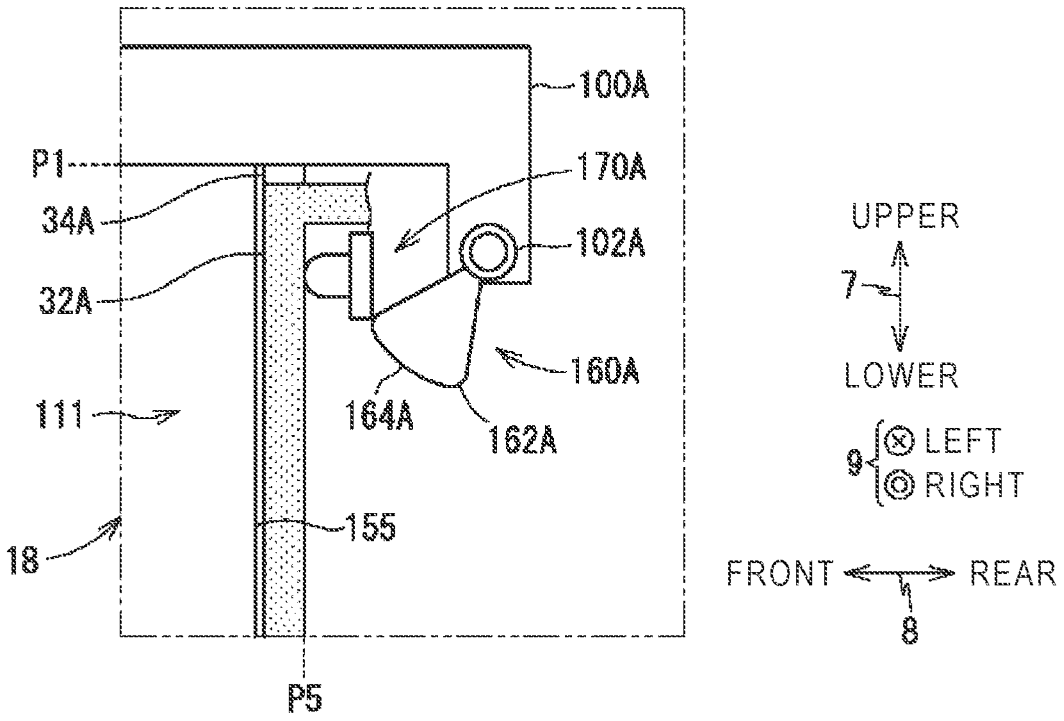
FIGS. 4A and 4B are schematic views showing examples of a detailed configuration of a valve 170A and a valve opening/closing mechanism 160A.
Figure 4B:
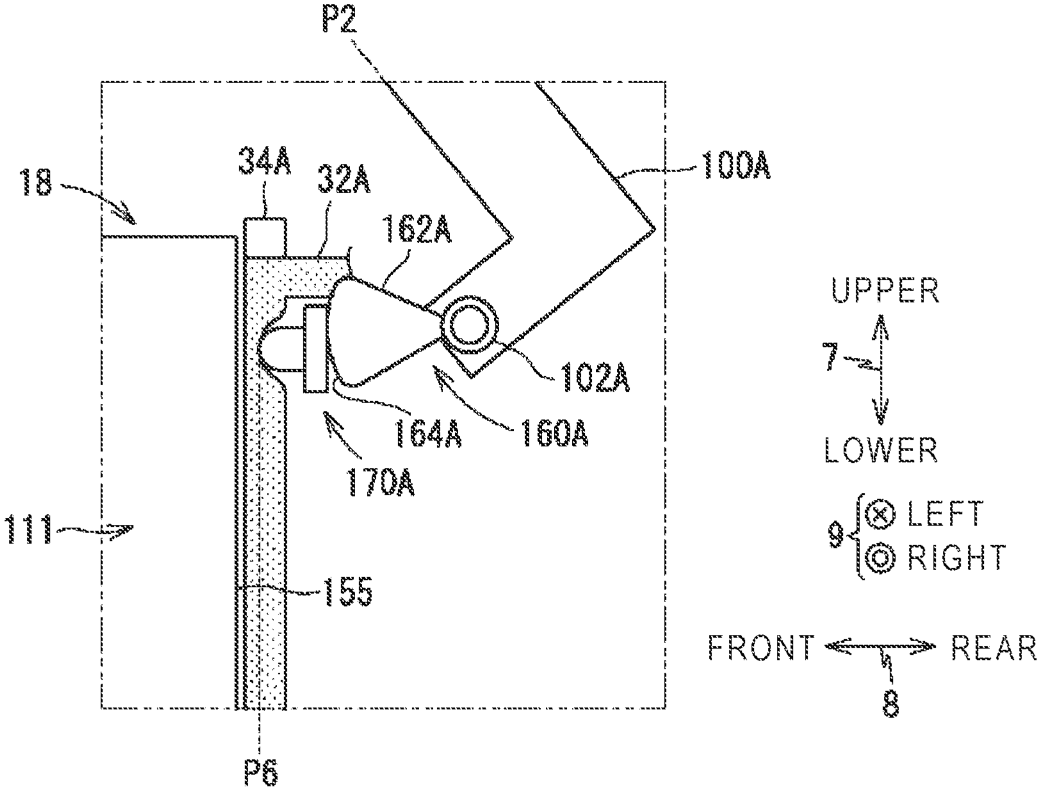

In FIGS. 4A and 4B, the valve 170A is, specifically, a rod-shaped member extending in the right and left direction 9. The valve 170A has a length in the right and left direction 9 capable of abutting against both the ink tube 32A and the air tube 34A on the rear wall 155. The valve 170A is supported to be movable in the front and rear direction 8 by a support member (not shown) provided for the housing 14 or the like. A front end of the valve 170A can move in the front and rear direction 8 between a position P5 (refer to FIG. 4A) and a position P6 (refer to FIG. 4B). The position P5 is located behind the position P6 in the front and rear direction 8. The front end of the valve 170A located in the position P5 is contacted to the ink tube 32A and the air tube 34A from the rear or is spaced rearward from the ink tube 32A and the air tube 34A. The valve 170A located in the position P5 is opened without elastically deforming the ink tube 32A and the air tube 34A (refer to FIG. 5A). As a result, the liquid or air can flow in the internal spaces of the ink tube 32A and the air tube 34A. The front end of the valve 170A located in the position P6 elastically crushes the ink tube 32A and the air tube 34A (refer to FIG. 5B). Thereby, the valve 170A located in the position P6 closes the ink tube 32A and the air tube 34A. As a result, the liquid or air cannot flow in the internal spaces of the ink tube 32A and the air tube 34A.

As shown in FIG. 4A, the valve opening/closing mechanism 160A has a pressing part 162A. The pressing part 162A is fixed to the shaft 102A, and rotates about the central axis of the shaft 102A in association with rotation of the cover 100A. The pressing part 162A extends diametrically from the central axis of the shaft 102A. When the cover 100A is located in the position P1, the pressing part 162A extends obliquely downward forward from the shaft 102A and a tip end portion 164A of the pressing part 162A is contacted or spaced with respect to the valve 170A. At this time, the valve 170A is kept in the position P5 by elastic forces of the ink tube 32A and the air tube 34A. As shown in FIG. 4B, when the cover 100A is located in the position P2, the pressing part 162A extends substantially forward from the shaft 102A and the tip end portion 164A abuts against the valve 170A. The valve 170A in contact with the tip end portion 164A is kept in the position P6 against the elastic forces of the ink tube 32A and the air tube 34A.

The tip end portion 164A forms a part of a cylindrical outer surface having the central axis of the shaft 102A as an axis. The tip end portion 164A rotates about the central axis together with the shaft 102A as the cover 100A moves between the position P1 and the position P2. Therefore, even when the cover 100A is slightly rotated from the position P2 toward the position P1, the tip end portion 164A is still in contact with the valve 170A.

[Operations of Cover 100A, Cap 104 and Valve 170A]

While the cover 100A is moved from the position P1 to the position P2 by the user operation, the cover 100A passes a position P7 (refer to FIG. 5B). The position P7 is an example of the third position. The position P7 is a position between the position P1 and the position P2.

As shown in FIG. 5A, when the cover 100A is located in the position P1, the cap 104 completely fits over the inlet 143 of the black tank 18. At this time, the tip end portion 164A of the valve opening/closing mechanism 160A is in slight contact with the valve 170A and the front end of the valve 170A is located in the position P5 (refer to FIG. 4A). At this time, the valve 170A located in the position P5 opens the ink tube 32A and the air tube 34A.

While the cover 100A is moved from the position P1 to the position P7, the tip end portion 164A starts to press against the valve 170A and the front end of the valve 170A starts to be displaced from the position P5 (refer to FIG. 4A) to the position P6 (refer to FIG. 4B). Specifically, when the cover 100A is located on a side closer to the position P1 than the position P7, the valve 170A opens at least a part of the ink tube 32A and the air tube 34A and is not completely closed. When the cover 100A is located on a side closer to the position P1 than the position P7, the cap 104 still seals the inlet 143 to seal the inside of the storage chamber 111.

As shown in FIG. 5B, when the cover 100A reaches the position P7, the front end of the valve 170A reaches the position P6 (refer to FIG. 4B). The valve 170A located in the position P6 completely closes the ink tube 32A and the air tube 34A. Even when the cover 100A is located between the position P7 and the position P2, the valve 170A is located in the position P6 and continues to close the ink tube 32A and the air tube 34A. In this case, the ink does not flow between the storage chamber 111 and the head 21A. Further, the air does not flow between the air chamber 112 and the outside of the black tank 18.

When the cover 100A reaches the position P7 and then the valve 170A completely closes the ink tube 32A and the air tube 34A, at least a part of the cap 104 is removed from the inlet 143, so that the inlet 143 is opened to the air. While the cover 100A is moved from the position P7 to the position P2, as shown in FIG. 5C, the cap 104 is completely removed from the inlet 143 and the user can pour ink into the storage chamber 111. At this time, since the air does not flow between the air chamber 112 and the outside of the black tank 18, the ink does not flow into the air chamber 112 from the storage chamber 111. Further, even when the liquid level of the ink in the storage chamber 111 is located higher than the nozzle surface 41 of the head 21A, the ink does not flow from the storage chamber 111 toward the head 21A.

On the other hand, while the cover 100A is moved from the position P2 to the position P1 by the user operation, when the cover 100A is located in a position closer to the position P2 than the position P7, the cap 104 starts to be fitted to the inlet 143, and seals the inlet 143 immediately before the cover 100A reaches the position P7. Thereby, the storage chamber 111 is sealed. Thereafter, i.e., while the cover 100A reaches the position P7 and then the position P1, the cap 104 completely fits over the inlet 143 to keep the storage chamber 111 in the sealed state.

After the cap 104 is sealed to the inlet 143, when the cover 100A reaches the position P7, the front end of the valve 170A starts to be displaced from the position P6 to the position P5, and the valve 170A starts to open the ink tube 32A and the air tube 34A. Thereafter, while the cover 100A reaches the position P1 from the position P7, the front end of the valve 170A reaches the position P5, and the valve 170A completely opens the ink tube 32A and the air tube 34A.

Note that, the valve 170B (refer to FIG. 2) has a configuration similar to the valve 170A, except that the valve 170B is arranged behind the rear wall 155 of the three-color tanks 19 and has a length capable of abutting against three ink tubes 32B and three air tubes 34B arranged along the rear wall 155 on the rear wall 155 of the three-color tanks 19, as compared to the valve 170A. Further, the valve opening/closing mechanism 160B (refer to FIG. 2) has a configuration similar to the valve opening/closing mechanism 160A, except that the valve opening/closing mechanism 160B is arranged on the cover 100B and can open and close the ink tube 32B and the air tube 34B (refer to FIG. 2), as compared to the valve opening/closing mechanism 160A. For this reason, the detailed descriptions of the configurations and operations of the valve 170B and the valve opening/closing mechanism 160B are omitted.

Operational Effects of Embodiment

According to the above configuration, when the cover 100A is located in the position P1, the cap 104 fits over the inlet 143, so that the cover 100A is not located in the position P1 in a state where the cap 104 is removed from the inlet 143. Therefore, a situation where the valve 170A is opened in a state where the inlet 143 is not sealed and thus the ink is leaked from the storage chamber 111 to the air chamber 112 of the black tank 18 or the ink flows from the storage chamber 111 toward the head 21A is suppressed.

Further, the cap 104 is coupled to the cover 100A, and the cap 104 fits over the inlet 143 in conjunction with an operation for moving the cover 100A from the position P2 to the position P1. In addition, the cap 104 is removed from the inlet 143 in conjunction with an operation for moving the cover 100A from the position P1 to the position P2. Therefore, the user can cause the cap 104 to fit to the inlet 143 or to remove from the inlet 143 without individually operating the cover 100A and the cap 104.

MODIFIED EMBODIMENTS

Note that, in the above embodiment, the cover 100A rotates about the shaft 102A. However, the present invention is not limited thereto. For example, the cover 100A may slide in the front and rear direction 8 with respect to the housing 14. In this case, the valve opening/closing mechanism 160A converts the front and rear direction 8 into a force in the upper and lower direction 7, to move the valve 170A in the upper and lower direction 7.

Further, in the above embodiment, the valve opening/closing mechanism 160A moves the valve 170A in conjunction with the movement of the cover 100A. However, the present invention is not limited thereto. For example, the valve opening/closing mechanism 160A may move the valve 170A in the upper and lower direction 7 in conjunction with opening/closing of the housing 15 (i.e., the scanner unit 12), to open or close the ink tube 32A and the air tube 34A.

Further, in the above embodiment, the valve 170A opens or closes both the ink tube 32A and the air tube 34A. However, the present invention is not limited thereto. For example, the valve 170A may open and close at least the air tube 34A. In this case, the ink tube 32A is opened and closed by another valve.

Figure 6:
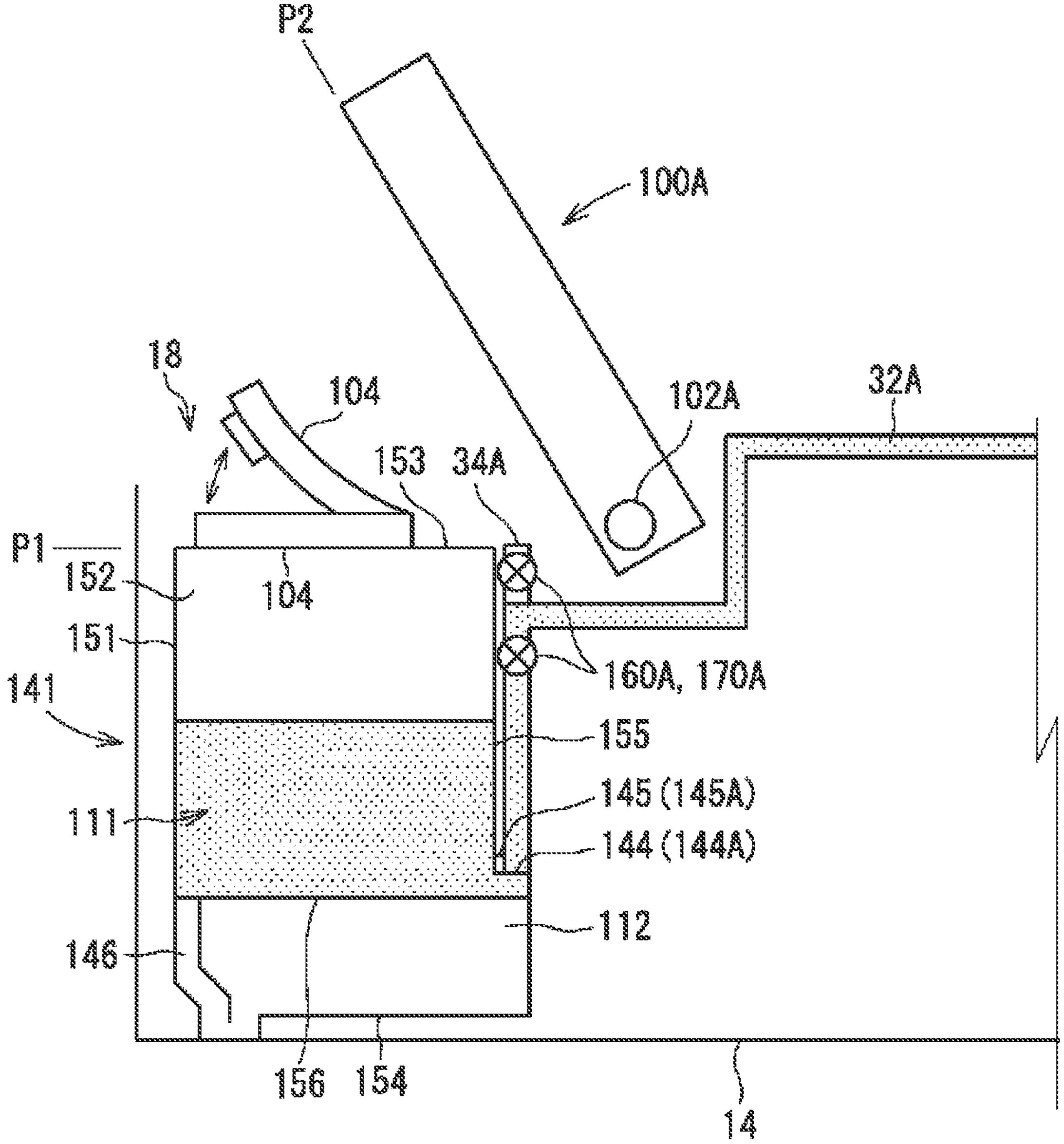
FIG. 6 is a schematic view showing another configuration example of the cover 100A and the cap 104.

Further, in the above embodiment, the cap 104 is coupled to the cover 100A. However, the timing at which the valve 170A is closed and the timing at which the cap 104 is opened are not necessarily required to be matched as long as a time difference is within a range of about several seconds. For this reason, as shown in FIG. 6, the cap 104 may not be coupled to the cover 100A. In this case, the cover 100A can be moved between the position P1 and the position P2 as shown in FIG. 6, and the valve 170A opens and closes the ink tube 32A and the air tube 34A in conjunction with opening/closing of the cover 100A.

Figure 7A:
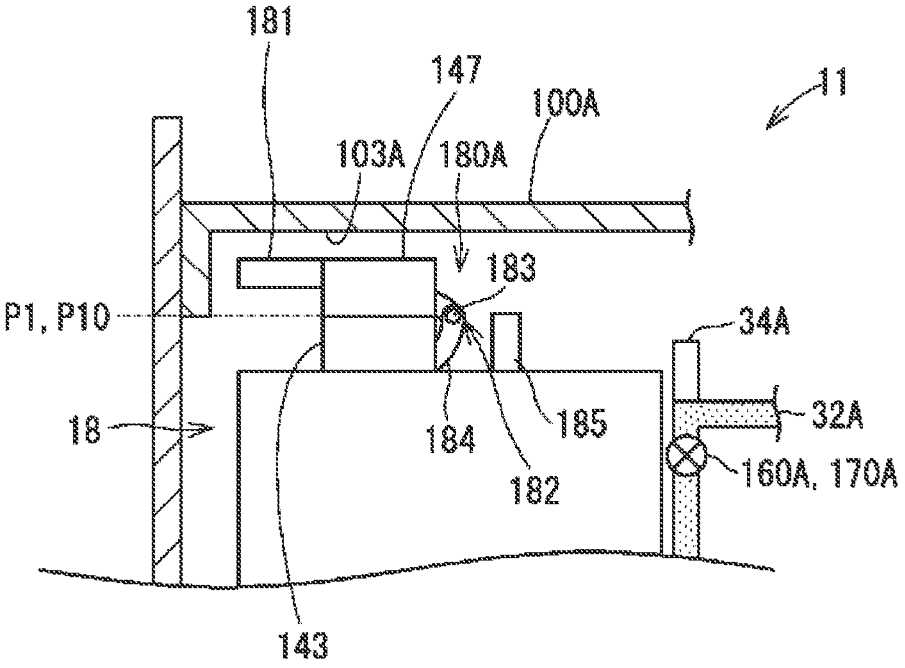
Figure 7B:
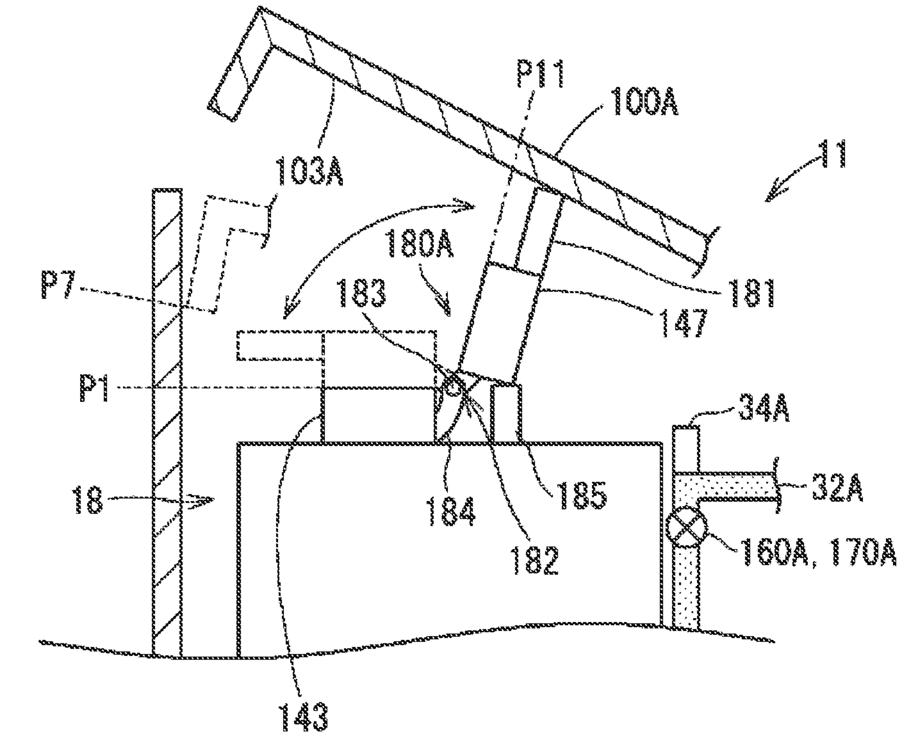

Further, as shown in FIGS. 7A and 7B, the complex machine 10 may be provided with a lock mechanism 180A. In the below, the lock mechanism 180A is described in detail with reference to FIGS. 7A and 7B. In descriptions below, differences from the above embodiment are described, and the configurations corresponding to the above embodiment are denoted with the same reference signs as the above embodiment.

[Cover 100A]

The cap is not coupled to a lower surface 103A (refer to FIGS. 7A and 7B) of the cover 100A.

[Black Tank 18]

The black tank 18 further has a cap 147. The cap 147 fits over the inlet 143 as shown in FIG. 7A, and the cap 147 can seal the inlet 143. In addition, as shown in FIG. 7B, when the cap 147 is pulled upward by the user, the cap 147 is removed from the inlet 143. The cap 147 is coupled to the inlet 143 via a lock mechanism 180A, and is movable between a position P10 (refer to FIG. 7A) and a position P11 (refer to FIG. 7B). The position P10 is an example of the fitting position, and is a position where the cap 147 fits over the inlet 143. The position P11 is an example of the removal position, and is a position in which the cap 147 is removed from the inlet 143.

[Lock Mechanism 180A]

In a state where the cap 147 is removed from the inlet 143, the lock mechanism 180A prevents the cover 100A from moving from the position P7 to the position P1. The lock mechanism 180A has a restriction member 181, and a rotation member 182.

[Restriction Member 181]

The restriction member 181 is a member for preventing the cover 100A from moving from the position P7 (an example of the third position) to the position P1 (an example of the first position) when the cap 147 is located in the position P11 (refer to FIG. 7B). When the cap 147 is located in the position P11, the restriction member 181 extends obliquely upward rearward from a part close to an upper end on a surface of the cap 147 by a predetermined distance. The predetermined distance is a distance at which, when the cover 100A is located in the position P7 (an example of the third position), a tip end of the restriction member 181 abuts against the lower surface 103A.

[Rotation Member 182]

The rotation member 182 supports the cap 147 to be rotatable between the position P10 and the position P11 in conjunction with the movement of the cap 147 with respect to the inlet 143 by the user operation. Specifically, the rotation member 182 has a shaft 183, a bearing 184, and a stopper member 185.

The shaft 183 is located at a part close to a rear lower end on the surface of the cap 147 located in the position P11, and extends in the right and left direction 9. The bearing 184 is located on a surface of the inlet 143 of the black tank 18 located at the use posture. Specifically, the bearing 184 is arranged in a position near a rear end on the surface of the inlet 143. The bearing 184 supports the shaft 183 to be rotatable about a central axis. The stopper member 185 protrudes rearward from a position on the surface of the inlet 143 below the bearing 184. An upper end of the stopper member 185 abuts against a part, at the rear of the shaft 183, on the surface of the cap 147 located in the position P11, thereby restricting the cap 147 from moving from the position P11.

Note that, the three-color tanks 19 may have the cap 147 for each of three colors, and a lock mechanism having a configuration similar to the lock mechanism 180A may be arranged for each of the caps 147 in the three-color tanks 19.

Effects of Modified Embodiment

According to the above modified embodiment, the restriction member 181 of the lock mechanism 180A is rotated between the position P10 and the position P11 and stops in the position P11, in conjunction with the movement of the cap 147. In this case, the tip end of the restriction member 181 abuts against the lower surface 103A of the cover 100A, thereby preventing the cover 100A from moving from the position P7 to the position P1. Therefore, a situation where the valve 170A is opened in a state where the inlet 143 is not sealed and thus the ink is leaked from the storage chamber 111 to the air chamber 112 is suppressed.

What is claimed is:

1. A liquid consumption device comprising:

a liquid consuming unit configured to consume liquid;

a tank having a storage chamber configured to store liquid supplied to the liquid consuming unit and an inlet for pouring liquid into the storage chamber;

a cap configured to seal the inlet;

an air chamber configured to communicate with the storage chamber and an outside of the tank, at least a part of the air chamber being located below the storage chamber at a use posture of the liquid consumption device; and a cover configured to be movable between a first position and a second position in which the cover is apart from the inlet as compared with the cover located in the first position, wherein when the cover is moved to the first position from the second position in a state where the inlet is not sealed with the cap, the inlet comes to be sealed with the cap.

2. The liquid consumption device according to claim 1, further comprising:

an air flow path configured to connect the air chamber and an outside of the tank, air being allowed to flow through the air flow path; and an air valve configured to open and close the air flow path.

3. The liquid consumption device according to claim 2, further comprising:

an outside cover configured to move between a closed position where the inlet and the cover are covered and an open position where the cover is exposed; and a valve opening/closing mechanism configured to open the air valve when the outside cover is located on a side closer to the closed position than the open position.

4. The liquid consumption device according to claim 2, further comprising:

a valve opening/closing mechanism configured to close the air valve when the cover is located on a side closer to the second position than the first position.

5. The liquid consumption device according to claim 4, further comprising:

an outside cover configured to move between a closed position where the inlet and the cover are covered and an open position where the cover is exposed.

6. The liquid consumption device according to claim 4, wherein the valve opening/closing mechanism is configured to close the air valve when the cover is located between the second position and a third position which is a position between the first position and the second position, and when the cover is moved to the first position from the third position in a state where the inlet is not sealed with the cap, the inlet comes to be sealed with the cap.

7. The liquid consumption device according to claim 2, further comprising:

a valve opening/closing mechanism configured to open the air valve when the cover is located on a side closer to the first position than the second position.

8. The liquid consumption device according to claim 7, wherein the valve opening/closing mechanism is configured to open the air valve when the cover is located on a side closer to the first position than a third position which is a position between the first position and the second position, and when the cover is moved to the first position from the third position in a state where the inlet is not sealed with the cap, the inlet comes to be sealed with the cap.

9. The liquid consumption device according to claim 2, further comprising:

a liquid flow path configured to connect the liquid consuming unit and the storage chamber, liquid being allowed to flow through the liquid flow path;

a liquid valve configured to open and close the liquid flow path; and a valve opening/closing mechanism configured to open the air valve when the cover is located on a side closer to the first position than a third position which is a position between the first position and the second position, and close the air valve when the cover is located between the third position and the second position, wherein the valve opening/closing mechanism is configured to open the liquid valve when the cover is located on a side closer to the first position than the third position.

10. The liquid consumption device according to claim 2, further comprising:

a valve opening/closing mechanism configured to open the air valve when the cover is located on a side closer to the first position than a third position which is a position between the first position and the second position, and close the air valve when the cover is located between the third position and the second position.

11. The liquid consumption device according to claim 1, wherein the cap is configured to fit over the inlet in conjunction with an operation for moving the cover to the first position from a third position which is a position between the first position and the second position.

12. The liquid consumption device according to claim 11, wherein the cap is coupled to the cover.

13. The liquid consumption device according to claim 1, further comprising a lock mechanism configured to prevent the cover from moving to the first position from a third position which is a position between the first position and the second position, in a state where the cap is removed from the inlet.

14. The liquid consumption device according to claim 13, wherein the lock mechanism is configured to operate in conjunction with a movement of the cap with respect to the inlet, and enables to move to a fitting position in which the cap fits over the inlet and a removal position in which the cap is removed from the inlet.

15. The liquid consumption device according to claim 14, wherein the lock mechanism is a rotation member configured to rotate between the fitting position and the removal position, and enables to abut against the cover located between the third position and the second position, in the removal position.

16. The liquid consumption device according to claim 1, wherein at a use posture of the liquid consumption device, a bottom surface of the air chamber is located below a lower surface of the liquid consuming unit.

17. The liquid consumption device according to claim 1, wherein the storage chamber and the air chamber are configured to communicate with each other, liquid being allowed to flow via communication holes opened on each of bottom surfaces-side of the storage chamber and the air chamber.

18. The liquid consumption device according to claim 1, wherein the tank has a housing configured to demarcate the storage chamber and the air chamber.

19. The liquid consumption device according to claim 1, wherein the cover located in the first position is configured to cover the liquid consuming unit, and the cover located in the second position is configured to be capable of exposing the liquid consuming unit.

20. The liquid consumption device according to claim 1, wherein the cover is arranged above an upper wall of the storage chamber.

* * * * *